Figure 1:
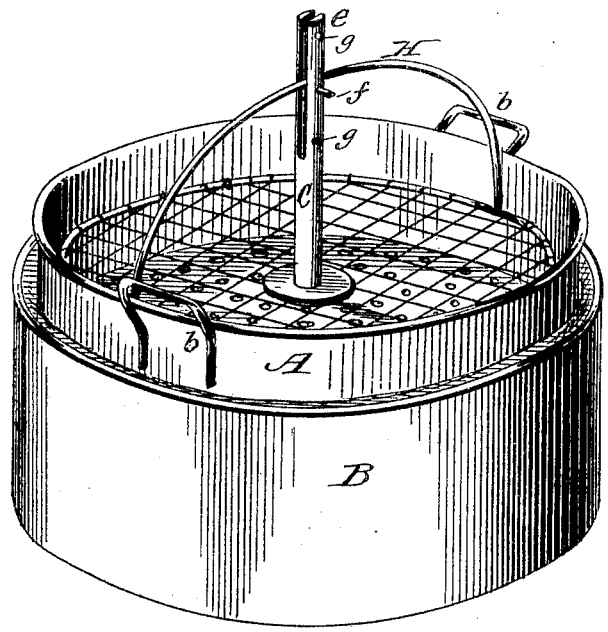

No. 797,660. PATENTED AUG. 22, 1905.
S. R. BROOKS.
COOKING DEVICE.
APPLICATION FILED MAR. 29, 1905.

2 SHEETS—SHEET 1.

Inventor
Sidney R. Brooks.

Witnesses
John E. Burch
W. W. Wallace

By Chas. H. Fowler
Attorney

No. 797,660. PATENTED AUG. 22, 1905.
S. R. BROOKS.
COOKING DEVICE.
APPLICATION FILED MAR. 29, 1905.
2 SHEETS—SHEET 2.
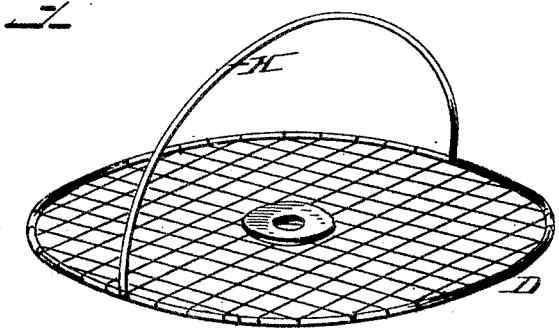
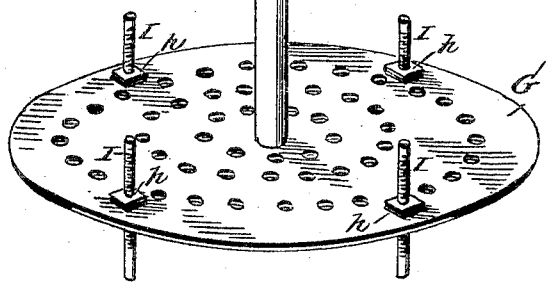
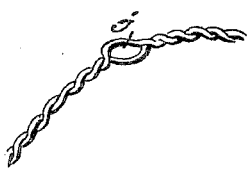

UNITED STATES PATENT OFFICE.

SIDNEY RODGERS BROOKS, OF ALLEGANY, NEW YORK.

COOKING DEVICE.

No. 797,660.     Specification of Letters Patent.     Patented Aug. 22, 1905.

Application filed March 29, 1905. Serial No. 252,736.

*To all whom it may concern:*

Be it known that I, SIDNEY RODGERS BROOKS, a citizen of the United States, residing at Allegany, in the county of Cattaraugus and State of New York, have invented certain new and useful Improvements in Cooking Devices; and I do hereby declare that the following is a full, clear, and exact description of the same, reference being had to the annexed drawings, making a part of this specification, and to the letters of reference marked thereon.

The present invention has for its purpose to materially improve in construction the devices heretofore used for the purpose of cooking large quantities of cakes and other edibles by submerging the same in boiling or hot lard or other greasy matter, the edibles being contained upon a plurality of shelves or trays which are submerged in a suitable receptacle containing the cooking medium, whereby the edibles are cooked uniformly.

The invention consists in a cooking device constructed substantially as shown in the drawings and hereinafter described and claimed.

Figure 2:
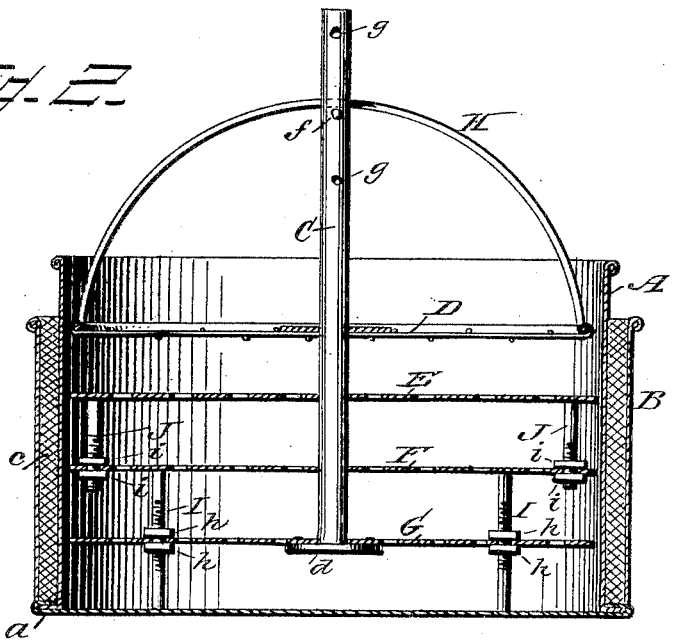

Figure 1 of the drawings is a perspective view of a cooking device constructed in accordance with my invention; Fig. 2, a sectional elevation thereof; Fig. 3, a detail perspective view of the upper one of the trays; Fig. 4, a similar view of the lower one of the trays; Fig. 5, a detail view showing a modification of the wire bail.

In the accompanying drawings, A represents a suitable vessel which is to contain boiling or hot lard or other greasy or oily matter and is provided at its bottom with an outer-extending circumferential supporting-flange $a$, upon which rests and is supported the bottomless casing B, and between the walls of the vessel and casing may be placed a layer or packing of asbestos $c$ or any other well-known non-conductor of heat, whereby the vessel is protected from contact with cold air, thus preventing the too rapid cooling of the grease used as a cooking medium.

The vessel A extends above the casing B and is provided with suitable handles $b$ for the purpose of lifting the complete device when required.

A central upright post C is provided to form a center brace and guide for a plurality of trays D, E, F, and G, although any number of trays may be used as found desirable, as I do not wish to be understood as limiting my invention to any particular form of tray, as the trays may be constructed of wire cloth or netting similar to the tray D or made of perforated sheet metal similar to the trays below it.

The tray G is rigidly secured to the lower end of the upright post C by means of a disk $d$, to which said tray is riveted or otherwise secured, the disk being firmly attached to the end of the post.

The tray D, which may be constructed of wire-netting, as shown, is provided with a bail H and engages the bifurcated end $e$ of the post C, and said tray is held at any height by means of a pin or key $f$, engaging holes $g$ in the bifurcated end of the post.

The lower one of the trays as indicated at G is provided with a suitable number of adjustable supports I and the tray F with adjustable supports J. These adjustable supports may be of any suitable construction, the supports I being held in their adjusted position by jam-nuts $h$ and the supports J by jam-nuts $i$, said nuts engaging screw-threads upon the supports, or any means may be employed to connect them.

The construction above described whereby the supports may be adjustable enables the spaces between the trays to be increased or diminished in height, as circumstances require. The upper one of the trays, as indicated at D, is rendered adjustable by means of the bail H and means for adjustably connecting it with the bifurcated end of the post, while the tray E does not require any supports connected thereto, as the space between it and the tray above it is adjusted by the suspension-bail adjustably connected to the bifurcated post. The entire number of the trays above the lower one is centered by the post C, which passes through the same, which is considered a decided advantage in the construction of this class of cooking devices, and although I have shown and described certain features of construction of the cooking device it is evident that many changes and modifications of the device without in any manner departing from the essential features of the invention and any such changes or modifications may be made as would come within ordinary judgment of the mechanic.

So far as the construction of the trays, the central post, the vessel, and casing are concerned the supports for the trays may be held in place by any means—such as rivets, screws, or solder—or otherwise connected, and the bail may be constructed of twisted wire with a loop $j$ to encircle the central post, and thereby dispense with the bifurcation.

Having now fully described my invention, what I claim as new, and desire to secure by Letters Patent, is—

1. A cooking device comprising a suitable vessel for containing the cooking medium, a central supporting-post having a tray rigidly connected thereto, a plurality of removable trays encircling the post, the upper one of which is provided with a suitable bail to engage the post, and suitable means for adjustably holding the bail suspended therefrom, substantially as and for the purpose set forth.

2. A cooking device comprising a suitable vessel for containing the cooking medium and having a circumferential outwardly-extending supporting-flange at its bottom, a bottomless casing encircling the vessel, a central supporting-post, a plurality of foraminous or reticulated trays engaging said post, the upper one of said trays being adjustably connected to the post, substantially as and for the purpose described.

3. A cooking device comprising a suitable vessel for containing the cooking medium, a central supporting-post having rigidly connected to its lower end a suitable tray, a plurality of removable trays engaging the post and adjustable with relation to each other, the upper one of the trays having a suitably-formed bail to engage the post and means for holding the bail adjustable upon the post, substantially as and for the purpose specified.

4. A cooking device comprising a suitable vessel for containing the cooking medium and provided with a supporting-flange at its base, a bottomless casing supported by said flange and a non-heat-conducting material interposed between the vessel and casing, a central supporting-post, a plurality of trays adjustable with relation to each other, the upper one of said trays having a bail adapted to engage the post and means for holding the bail in its adjusted position thereon, substantially as and for the purpose set forth.

In testimony whereof I affix my signature in presence of two witnesses.

SIDNEY RODGERS BROOKS.

Witnesses:
CLAIR S. McGAVERN,
JOHN L. SCHMIDT.